United States Patent
Li et al.

(10) Patent No.: US 12,337,675 B2
(45) Date of Patent: Jun. 24, 2025

(54) METHOD FOR DISSIPATING HEAT FROM VEHICLE, STORAGE MEDIUM AND VEHICLE

(71) Applicant: GREAT WALL MOTOR COMPANY LIMITED, Hebei (CN)

(72) Inventors: Chao Li, Hebei (CN); Ming Sun, Hebei (CN); Xuemeng Li, Hebei (CN); Jun Wang, Hebei (CN); Wenfei Wei, Hebei (CN); Xuejing Li, Hebei (CN); Yongpo Zhao, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 260 days.

(21) Appl. No.: 18/011,685

(22) PCT Filed: Dec. 31, 2021

(86) PCT No.: PCT/CN2021/143785
§ 371 (c)(1),
(2) Date: Dec. 20, 2022

(87) PCT Pub. No.: WO2022/166500
PCT Pub. Date: Aug. 11, 2022

(65) Prior Publication Data
US 2023/0249538 A1    Aug. 10, 2023

(30) Foreign Application Priority Data
Feb. 5, 2021   (CN) .......................... 202110163685.1

(51) Int. Cl.
*F02P 7/00*     (2006.01)
*B60K 11/06*    (2006.01)
*B60K 11/08*    (2006.01)

(52) U.S. Cl.
CPC ............ *B60K 11/06* (2013.01); *B60K 11/085* (2013.01)

(58) Field of Classification Search
CPC ....... B60K 11/085; B60K 11/06; B60K 11/08; F01P 2025/66; F01P 2001/005
See application file for complete search history.

(56) References Cited

U.S. PATENT DOCUMENTS 5,224,446 A * 7/1993 Okita ...................... F01P 7/046
                                                  123/41.12
8,936,121 B2 * 1/2015 Vacca ..................... B60K 11/04
                                                  165/44

(Continued)

FOREIGN PATENT DOCUMENTS

CN    104675502 A  *  6/2015  ........... B60K 11/085
CN    104972894 A      10/2015
(Continued)

*Primary Examiner* — George C Jin
*Assistant Examiner* — Teuta B Holbrook
(74) *Attorney, Agent, or Firm* — Nath, Goldberg & Meyer; Joshua B. Goldberg (57) ABSTRACT

The present disclosure provides a method for dissipating heat from a vehicle, a storage medium, and a vehicle. The method includes the following steps: determining a target opening angle of an active air-intake grille based on a current vehicle-speed and a current heat-dissipation demand of the vehicle while the vehicle is in a driving state; determining a residual heat-dissipation demand of the vehicle based on the current heat-dissipation demand and a heat-dissipation demand that can be provided by the target opening angle; determining, according to the residual heat-dissipation demand, the target speed gear required for the cooling fan of the vehicle to provide the residual heat-dissipation demand; and adjusting an opening angle of the active air-intake grille of the vehicle to the target opening (Continued)

angle and a speed gear of the cooling fan to the target speed gear, to perform a heat dissipation for the vehicle.

14 Claims, 3 Drawing Sheets

(56) References Cited

U.S. PATENT DOCUMENTS

| | | | |
|---|---|---|---|
| 2011/0137530 A1 | 6/2011 | Kerns | |
| 2013/0036991 A1* | 2/2013 | Kerns | F01P 7/10 123/41.04 |
| 2014/0251239 A1* | 9/2014 | Richards | F02B 29/0468 123/41.05 |
| 2018/0209324 A1* | 7/2018 | Schwartz | F01P 7/048 |
| 2018/0312053 A1 | 11/2018 | Moro et al. | |
| 2019/0234291 A1* | 8/2019 | Cunningham | F01P 7/04 |
| 2019/0272687 A1* | 9/2019 | Dudar | F01P 5/043 |

FOREIGN PATENT DOCUMENTS

| | | | | |
|---|---|---|---|---|
| CN | 105888817 A | * | 8/2016 | F01P 1/08 |
| CN | 106252782 A | * | 12/2016 | B60K 11/04 |
| CN | 107120170 A | | 9/2017 | |
| CN | 107816446 A | * | 3/2018 | F04D 27/004 |
| CN | 109139275 A | * | 1/2019 | B60K 11/085 |
| CN | 107166667 B | * | 11/2019 | |
| CN | 109236456 B | * | 11/2019 | F01P 11/10 |
| CN | 110539629 A | * | 12/2019 | B60K 11/08 |
| CN | 111572409 A | | 8/2020 | |
| CN | 112026590 A | | 12/2020 | |
| DE | 112012003641 T5 | * | 5/2014 | B60K 1/00 |
| DE | 102017113219 A1 | * | 12/2017 | B60K 11/02 |

* cited by examiner

METHOD FOR DISSIPATING HEAT FROM VEHICLE, STORAGE MEDIUM AND VEHICLE

CROSS-REFERENCE TO RELATED APPLICATIONS

This disclosure is a 35 U.S.C. § 371 national stage application of PCT Application Ser. No. PCT/CN2021/143785 filed on Dec. 31, 2021, which claims the benefit of Chinese Patent Application No. 202110163685.1 filed on Feb. 5, 2021, the contents of which are incorporated herein by reference.

FIELD

The present disclosure relates to the field of vehicle technologies, and in particular, to a method for dissipating heat from a vehicle, a storage medium, and a vehicle.

BACKGROUND

Nowadays, vehicles are typically equipped with an active grille that is capable of adjusting an opening angle thereof. The main advantages of the active air-intake grille include that: the heat loss can be reduced when the vehicle is started, thereby enabling the engine, motor and other parts to be heated up quickly in the shortest possible time; or the heat can be used for heating other components and heating the crew compartment. Moreover, the closing of the active grille can bring a lower wind resistance coefficient to the vehicle when the vehicle is driving at a high speed, thereby improving the stability and economy of the vehicle.

Nevertheless, the opening and closing of the active air-intake grille and the cooling performance of the vehicle are often contradictory to each other. While the wind resistance coefficient of the vehicle is reduced by closing the active air-intake grille, the closing of the active air-intake grille also leads to a reduction in air intake of a front-end cooling module of the vehicle, resulting in a significant decrease in heat-dissipation capacity of the vehicle, which leads to a need for the cooling system to increase a power for heat dissipation and, on the contrary, increases a low-voltage energy consumption of the vehicle. Therefore, it is necessary to jointly control the opening angle of the active air-intake grille and the operation of the cooling system to reduce the energy consumption of the whole vehicle.

SUMMARY

An objective of the present disclosure is to provide a method for dissipating heat from a vehicle, a storage medium, and a vehicle. The method to solve the problem that closing an active air-intake grille while driving a vehicle will lead to increased energy consumption in the existing technologies.

To achieve the above objective, a first aspect of the present disclosure provides a method for dissipating heat from a vehicle, which includes the following steps: obtaining a current speed and a current heat-dissipation demand of the vehicle while the vehicle is in a driving state; determining, according to the current speed and the current heat-dissipation demand, a target opening angle of an active air-intake grille matching both the current speed and the current heat-dissipation demand; determining a residual heat-dissipation demand of the vehicle based on the current heat-dissipation demand and a heat-dissipation demand that the target opening angle can provide; determining, according to the residual heat-dissipation demand, a target speed gear required for the cooling fan of the vehicle to provide the residual heat-dissipation demand; and adjusting an opening angle of the active air-intake grille to the target opening angle and adjusting a speed gear of the cooling fan to the target speed gear to perform a heat dissipation for the vehicle.

Optionally, the step of determining, according to the current vehicle-speed and the current heat-dissipation demand, a target opening angle of an active air-intake grille matching both the current vehicle-speed and the current heat-dissipation demand includes a step of looking up, in a predetermined opening angle table, a target opening angle of the active air-intake grille matching both the current speed and the current heat-dissipation demand, according to the current speed and the current heat-dissipation demand.

One vehicle-speed and a value of one heat-dissipation demand at that vehicle-speed in the opening angle table corresponds to one opening angle. In the opening angle table, the value of the heat-dissipation demand at a same vehicle-speed increases as the opening angle of the active air-intake grille increases. The value of the heat-dissipation demand at a same opening angle increases as the vehicle-speed increases after the vehicle-speed of the vehicle reaches a predetermined speed threshold.

Optionally, the step of determining, according to the residual heat-dissipation demand, a target speed gear required for a cooling fan of the vehicle to provide the residual heat-dissipation demand, includes a step of calculating, according to the residual heat-dissipation demand, the target speed gear required for the cooling fan of the vehicle to provide the residual heat-dissipation demand using a predetermined calculation equation; wherein the predetermined calculation equation is expressed as follows:

$$S=(H-L)\times M+L$$

where S denotes the target speed gear of the cooling fan,
H denotes the maximum speed gear of the cooling fan,
L denotes the minimum speed gear of the cooling fan,
and M denotes the residual heat-dissipation demand.

Optionally, the method also includes a step of controlling the active air-intake grille to be fully opened in an event that the cooling fan needs to be operated and the cooling fan malfunctions.

Optionally, the method also includes steps of controlling the active air-intake grille to be fully closed and controlling the cooling fan to stop operation in case that the vehicle does not have a heat-dissipation demand while the vehicle is in the driving state.

Optionally, the method also includes steps of: controlling the active air-intake grille to be fully opened in case that the vehicle has a heat-dissipation demand while the vehicle is in an idle start condition; determining, according to the current heat-dissipation demand of the vehicle and a heat-dissipation demand that can be provided by the active air-intake grille when the active air-intake grille is fully opened, a heat-dissipation demand to be provided by the cooling fan; determining, according to the heat-dissipation demand to be provided by the cooling fan, a speed gear required for the cooling fan to provide the to-be-provided heat-dissipation demand; and controlling the cooling fan to operate at the speed gear.

Optionally, the method also includes a step of controlling the active air-intake grille to fully close if the heat-dissipation demand does not exist for the vehicle while the vehicle is in an idle start condition, and controlling the cooling fan to stop operation.

In accordance with a second aspect of the present disclosure, a vehicle is provided, which includes: an active air-intake grille, a cooling fan, an information acquisition module, a memory and a controller.

The information acquisition module is configured to obtain a current speed and a current heat-dissipation demand.

The memory is configured to store a program code for implementing the method for dissipating heat from the vehicle described in any of the above embodiments The controller is configured to execute the program code stored in the memory to control the opening angle of the active air-intake grille and the rotation speed of the cooling fan according to the current vehicle-speed and the current heat-dissipation demand.

Optionally, the cooling fan is a multi-stage speed control fan.

In accordance with a third aspect of the present disclosure, a computing processing device is provided, which includes: a memory in which a computer readable code is stored; and one or more processors. The computing processing device is caused to perform the method for dissipating heat from the vehicle proposed in an embodiment of a first aspect of the present disclosure when the computer readable code is executed by the one or more processors.

In accordance with a fourth aspect of the present disclosure, a computer program is provided, which includes a computer readable code that, when the computer readable code is run on a computing processing device, causes the computing processing device to execute the method for dissipating heat from the vehicle as set forth in an embodiment of the first aspect of the present disclosure.

In accordance with a fifth aspect of the present disclosure, a computer readable storage medium is provided, in which a computer program as described in a fourth aspect is stored.

Based on the above schemes, the operation between the active air-intake grille and the cooling fan is coordinated by determining, according to a current speed and a current heat-dissipation demand, a target opening angle of the active air-intake grille that matches both the current vehicle-speed and the current heat-dissipation demand, and calculating a target speed gear required for the cooling fan to provide a residual heat-dissipation demand in an event that the target opening angle of the active air-intake grille is determined. Thus, by jointly controlling the active air-intake grille and the cooling fan according to the vehicle-speed and the heat-dissipation demand of the vehicle, the opening angle of the active air-intake grille and the impact of the cooling fan on the energy consumption of the vehicle can be considered comprehensively, so that the active air-intake grille and the cooling fan can operate in the lowest energy-consumption mode while meeting the heat-dissipation demand of the vehicle, thus minimizing the energy consumption of the vehicle.

Other features and benefits of the present disclosure will be further described below in the section of detailed description of the embodiments.

BRIEF DESCRIPTION OF THE DRAWINGS

The foregoing and/or additional aspects and advantages of the present disclosure will become apparent and readily understood from the following description of embodiments in conjunction with the accompanying drawings, in which.

DETAILED DESCRIPTION OF THE EMBODIMENTS

Embodiments of the present disclosure are described in detail below in conjunction with the drawings. It should be understood that the specific embodiments described herein are intended to illustrate and explain the present disclosure only and are not intended to limit the present disclosure.

Figure 1:
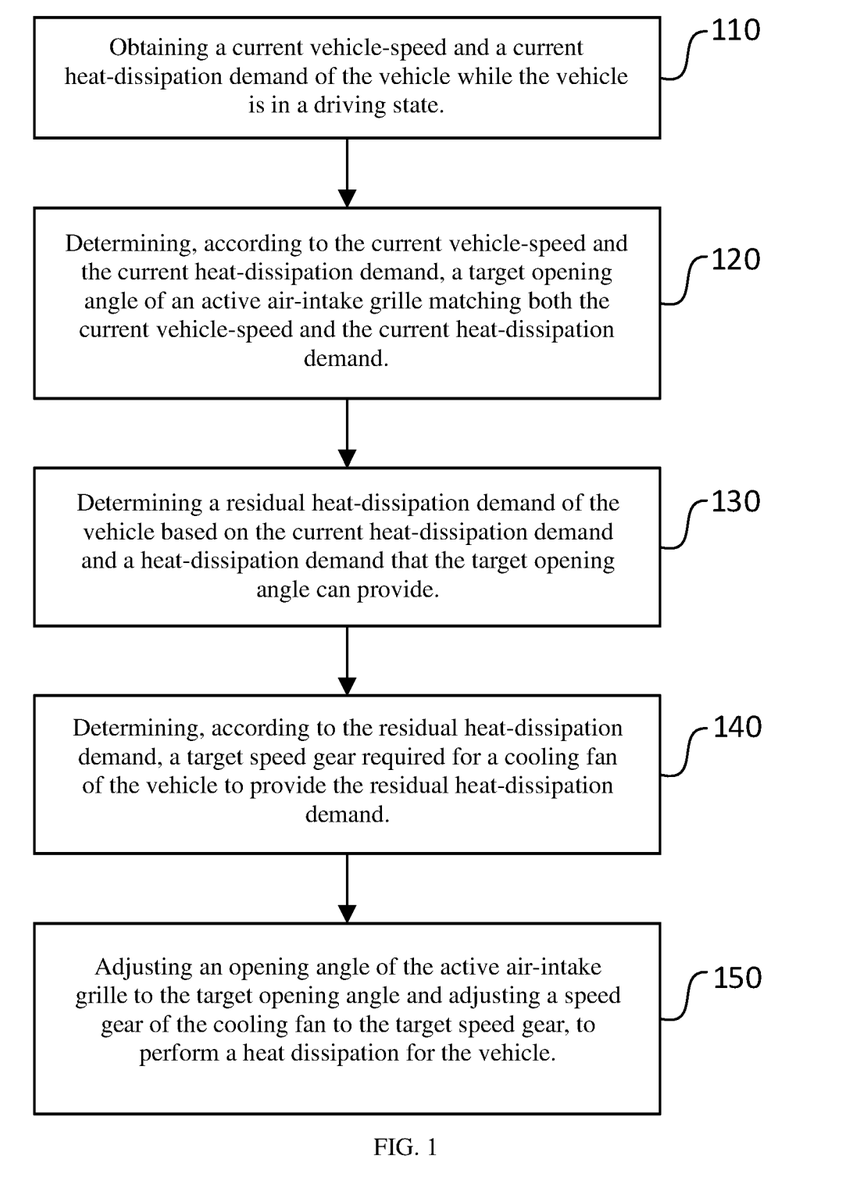
FIG. 1 is a schematic flow diagram of a method for dissipating heat from a vehicle according to an exemplary embodiment.

FIG. 1 is a schematic flow diagram of a method for dissipating heat from a vehicle provided according to an exemplary embodiment. As shown in FIG. 1, an exemplary embodiment of the present disclosure provides a method for dissipating heat from a vehicle, and the method include steps 110 to 150.

In step 110, a current vehicle-speed and a current heat-dissipation demand of the vehicle is acquired when the vehicle is in a driving state.

In step 120, a target opening angle of the active air-intake grille that matches the current vehicle-speed and the current heat-dissipation demand is determined according to the current vehicle-speed and the current heat-dissipation demand.

In step 130, a residual heat-dissipation demand of the vehicle is determined based on a heat-dissipation demand that the target opening angle can provide and the current heat-dissipation demand.

In step 140, a target speed gear required for a cooling fan of the vehicle to provide the residual heat-dissipation demand is determined according to the residual heat-dissipation demand.

In step 150, an opening angle of the active air-intake grille is adjusted to the target opening angle and a speed gear of the cooling fan is adjusted to the target speed gear, to perform a heat dissipation for the vehicle.

Here, in the step 110, the vehicle is in a driving state means that the vehicle is driven at a vehicle-speed greater than 0. When the vehicle is in the driving state, an opening of the active air-intake grille increases the wind resistance coefficient of the vehicle, while a closing of the active air-intake grille will cause the cooling performance of the vehicle to be reduced. Thus, it is necessary to adjust, according to the current vehicle-speed and the current heat-dissipation demand, the opening angle of the active air-intake grille and the rotation-speed of the cooling fan, when the vehicle is in the driving state, to adjust an energy consumption of the vehicle, thereby enabling the energy consumption of the vehicle to always be maintained at the lowest value.

In this embodiment, it is required for a motor cooling of the vehicle that a water temperature at an inlet of the motor is maintained below 65° C., to minimize the cooling energy consumption. The higher the water temperature at the inlet of the motor is maintained, the greater the temperature difference between the water temperature and the environment, the larger the heat-exchange rate of the air, and the lower the rotation-speed of the fan. Thus, the current heat-dissipation demand of the vehicle may be determined according to the following processes.

The water temperature is monitored at the inlet of the motor of the vehicle, to determine a current water temperature at the inlet of the motor and a variation rate of the water temperature; then the heat-dissipation demand matching both the current water temperature and the variation rate of the water temperature is determined according to the current water temperature and the variation rate of the water temperature; and then the determined heat-dissipation demand is the current heat-dissipation demand of the vehicle. In an embodiment, the heat-dissipation demand matching both the current water temperature and the variation rate of water temperature may be determined from a heat-dissipation demand table. In the heat-dissipation demand table, one water temperature and one variation rate of water temperature at that water temperature corresponds to a value of the heat-dissipation demand. The value of the heat-dissipation demand in the heat-dissipation demand table increases with an increase in the variation rate of water temperature at the same water temperature, and the value of the heat-dissipation demand at the same variation rate of water temperature increases with the increase in water temperature. This heat-dissipation demand table is shown in Table 1.

TABLE 1

|  |  | Water temperature at inlet of motor (° C.) | | | | |
| --- | --- | --- | --- | --- | --- | --- |
|  |  | 55° C. | 57° C. | 59° C. | 61° C. | 63° C. |
| Variation rate of water temperature (° C./s) | 0.2 | 40% | 100% | 150% | 200% | 200% |
|  | 0.1 | 15% | 70% | 120% | 180% | 200% |
|  | 0 | 1% | 40% | 100% | 180% | 200% |
|  | −0.1 | 1% | 1% | 70% | 150% | 200% |
|  | −0.2 | 1% | 1% | 70% | 150% | 200% |

As shown in Table 1, at a current water temperature of 55° C. and a water-temperature variation rate of 0.2° C./s, the current heat-dissipation demand is 40%. At a current water temperature of 56.5° C. and a water-temperature variation rate of 0.15° C./s, the corresponding heat-dissipation demand can be calculated through a difference operation based on the table data. The difference operation may be a linear difference operation, then the result of linear difference operation is 70.625%. The heat-dissipation demand has the maximum value of 200% when the water temperature is greater than 63° C., and the value of the heat-dissipation demand is 0% when the water temperature is smaller than 55° C.

As a result, a variation trend of water temperature can be determined according to the variation rate of the water-temperature, which enables a cooling system of the vehicle to make cooling prediction in advance. For example, in the case of the same water temperature, the water temperature is at a greater variation rate, indicating that the vehicle heat is increased, the cooling capacity of the vehicle is increased to reduce a temperature-increase rate of the vehicle, and conversely, the water temperature is at a lower variation rate or even has a negative variation rate, indicating that the water temperature has been controlled or even began to decline, then the cooling capacity of the vehicle may be reduced.

It should be understood that the current heat-dissipation demand is calculated based on the water temperature and the variation rate of the water temperature is a preferred embodiment of the present disclosure. However, in the present disclosure, the current heat-dissipation demand of the vehicle may also be obtained by calculating the heat-exchange demand (including a heat-dissipation demand and a heat absorption demand) of a front-end module, or, the heat-dissipation demand may be calculated with reference to the maximum heat-exchange demand of a cabin heat-exchange module (e.g., a heat-exchange demand of a cooling system, or an air-conditioning system). In the step 120, the target opening angle of the active air-intake grille that matches both the current vehicle-speed and the current heat-dissipation demand can be uniquely determined according to the current vehicle-speed and the current heat-dissipation demand. For example, if the current vehicle-speed is 30 km/h and the heat-dissipation demand is 80%, the target opening angle of the active air-intake grille that matches the current vehicle-speed of 30 km/h and heat-dissipation demand of 80% may be uniquely determined to be 70°.

In the step 130, the heat-dissipation demand that can be provided by the target opening angle is the heat-dissipation demand that can be provided to the vehicle when the opening angle of the active air-intake grille is at the target opening angle, such as for a target opening angle of 70°, a heat-dissipation demand of 77% can be provided, and for a target opening angle of 30°, a heat-dissipation demand of 33% can be provided. Thus, on the premise that the current heat-dissipation demand is known, the difference between the current heat-dissipation demand and the heat-dissipation demand that can be provided by the target opening angle may be regarded as the residual heat-dissipation demand of the vehicle. The residual heat-dissipation demand is a heat-dissipation demand that needs to be provided by the cooling fan.

It should be understood that for different vehicle models, the heat-dissipation demand that can be provided by the active air-intake grille at different opening angles can be calculated based on the actual vehicle model.

In the step 140, the residual heat-dissipation demand is the heat-dissipation demand that needs to be provided by the cooling fan, and therefore, it is only needed to calculate the speed gear required by the cooling fan to provide this residual heat-dissipation demand. For example, the heat-dissipation demand that the cooling fan is capable of providing per unit speed may be calculated, to determine the speed gear required for the cooling fan.

It is worth noting that the cooling fan may be a multi-stage speed control fan. Since the multi-stage speed control fan behaves differently in terms of low-voltage energy consumption at different speeds, energy consumption can be saved by reducing the speed in the case of lower heat-dissipation demand.

It should be understood that for different models of cooling fans, the heat-dissipation demand that can be provided per unit speed varies, and therefore the target speed gear required for the same residual heat-dissipation demand may differ for different models of cooling fans.

In the step 150, the opening angle of the active air-intake grille is adjusted according to the determined target opening angle, and the speed gear of the cooling fan is adjusted according to the determined target speed gear. For example, if the target opening angle of the active air-intake grille is 10° and the target speed gear of the cooling fan is 17.2%, the active air-intake grille is controlled to be opened at 100 and the gear of the cooling fan is adjusted to 17.2%.

Thus, by jointly controlling the active air-intake grille and the cooling fan according to the vehicle-speed and the heat-dissipation demand of the vehicle, the opening angle of the active air-intake grille and the impact of the cooling fan on the energy consumption of the vehicle can be considered comprehensively, so that the active air-intake grille and the cooling fan can operate in the lowest energy-consumption mode while meeting the heat-dissipation demand of the vehicle, thus minimizing the energy consumption of the vehicle.

In an implementable embodiment, the step 120 of determining the target opening angle of the active air-intake grille that matches both the current vehicle-speed and the current heat-dissipation demand according to the current vehicle-speed and the current heat-dissipation demand, includes a step of: looking up, in a predetermined opening angle table, the target opening angle of the active air-intake grille matching both the current vehicle-speed and the current heat-dissipation demand according to the current vehicle-speed and the current heat-dissipation demand.

One vehicle-speed and a value of one heat-dissipation demand at that vehicle-speed in the opening angle table corresponds to one opening angle.

At the same vehicle-speed, the value of the heat-dissipation demand in the opening angle table increases as the opening angle of the active air-intake grille increases, and the value of the heat-dissipation demand in the opening angle, at the same opening angle, increases as the vehicle-speed increases when the vehicle-speed of the vehicle reaches a predetermined speed threshold.

In this embodiment, Table 2 is a table of opening angles according to an exemplary embodiment, and after the current vehicle-speed and the current heat-dissipation demand is acquired, the opening angles of the active air-intake grille that matches both the current vehicle-speed and the current heat-dissipation demand can be looked up in the table of the opening angles shown in Table 2.

In addition, the value of the heat-dissipation demand in the opening angle table increases with the opening angle of the active air-intake grille at the same vehicle-speed. For example, at a vehicle-speed of 10 km/h, the value of the heat-dissipation demand increases from 0.0% to 200% as the opening angle of the active air-intake grille gradually increases from 0° to 90°.

At the same time, the value of the heat-dissipation demand at the same opening angle increases with the vehicle-speed when the vehicle-speed of the vehicle reaches the predetermined speed threshold. For example, as shown in Table 2, after the vehicle-speed exceeds 20 km/h, the value of the heat-dissipation demand at the same opening angle increases with the vehicle-speed. For example, at a vehicle-speed of 40 km/h, and an opening angle of 10°, the corresponding heat-dissipation demand is 9.3%. At a vehicle-speed of 50 km/h, and an opening angle of 10°, the heat-dissipation demand is 20.1%.

The pattern of the data in Table 2 shows that when the vehicle-speed of the vehicle is too low, such as lower than or equal to 20 km/h, the same opening angle of the active air-intake grille corresponds to the same heat-dissipation demand, which means that in this case, the opening angle of the active air-intake grille has a lower effect on the wind resistance coefficient of the vehicle. Thus, as the heat-dissipation demand of the vehicle increases, the opening angle of the active air-intake grille gradually increases until the active air-intake grille is completely opened, and only then the rotation-speed of the cooling fan starts to increase according to the increase of the heat-dissipation demand.

Moreover, with the gradual increase of the vehicle-speed, the influence of the active air-intake grille on the wind resistance coefficient increases gradually. Thus, in Table 2, the value of the heat-dissipation demand at the same opening angle is gradually increased with the vehicle-speed, which enables the time for turning on the cooling fan and the time for increasing the rotation-speed to be gradually advanced. In other words, the cooling fan is preferentially turned on for heat dissipation when the vehicle-speed is increased gradu-

TABLE 2

| vehicle-speed km/h | opening angle of active air-intake grille | | | | | | | | | |
|---|---|---|---|---|---|---|---|---|---|---|
| | 0° (0%) | 10° (11%) | 20° (22%) | 30° (33%) | 40° (44%) | 50° (55%) | 60° (66%) | 70° (77%) | 80° (88%) | 90° (100%) |
| 10 | 0.0% | 11.0% | 22.0% | 33.0% | 44.0% | 55.0% | 66.0% | 77.0% | 88.0% | 200% |
| 20 | 0.0% | 11.0% | 22.0% | 33.0% | 44.0% | 55.0% | 66.0% | 77.0% | 88.0% | 200% |
| 30 | 0.0% | 15.2% | 29.0% | 41.8% | 53.9% | 65.6% | 77.2% | 88.9% | 100.1% | 200% |
| 40 | 9.3% | 29.7% | 46.4% | 59.9% | 72.4% | 84.3% | 96.1% | 107.8% | 119.2% | 200% |
| 50 | 20.1% | 43.0% | 60.3% | 74.0% | 86.7% | 98.8% | 110.7% | 122.5% | 134.0% | 200% |
| 60 | 35.0% | 59.4% | 76.4% | 90.8% | 103.8% | 116.2% | 128.3% | 140.2% | 151.6% | 200% |
| 70 | 44.4% | 69.5% | 87.6% | 102.5% | 115.8% | 128.4% | 140.7% | 152.7% | 164.1% | 200% |
| 80 | 53.4% | 79.6% | 98.8% | 113.8% | 127.2% | 139.9% | 152.2% | 164.5% | 177.1% | 200% |
| 90 | 63.6% | 91.6% | 116.0% | 133.0% | 144.0% | 155.0% | 166.0% | 177.0% | 188.0% | 200% |
| 100 | 74.1% | 111.0% | 122.0% | 133.0% | 144.0% | 155.0% | 166.0% | 177.0% | 188.0% | 200% |
| 110 | 84.1% | 111.0% | 122.0% | 133.0% | 144.0% | 155.0% | 166.0% | 177.0% | 188.0% | 200% |
| ≥120 | 100.0% | 111.0% | 122.0% | 133.0% | 144.0% | 155.0% | 166.0% | 177.0% | 188.0% | 200% |

As shown in Table 2, one vehicle-speed and a value of one heat-dissipation demand at that vehicle-speed may correspond to one opening angle in the opening angle table. For example, at a vehicle-speed of 10 km/h and a heat-dissipation demand of 22%, the corresponding opening angle is 20°. At a vehicle-speed of 10 km/h and a heat-dissipation demand of 66%, the corresponding opening angle is 60°. At a vehicle-speed of 30 km/h and a heat-dissipation demand of 29%, the corresponding opening angle is 20°.

ally. At this time, the energy consumption required by the cooling fan to provide the same heat-dissipation demand is lower than that required by the active air-intake grille to provide the same heat-dissipation demand, so the fan is turned on first. Especially when the vehicle-speed is higher than 120 km/h, it will completely change to that: the fan is turned on first, and the rotation-speed of the cooling fan gradually increases, as the heat-dissipation demand increases, until the maximum rotation-speed of the cooling fan is reached, and then the opening angle of the active air-intake grille increases with the heat-dissipation demand.

It should be understood that the table of the opening angles may also include the heat-dissipation demand that the active air-intake grille can provide at different opening angles, such as at an opening angle of 10°, the heat-dissipation demand is 11%, and at an opening angle of 20°, the heat-dissipation demand is 22%.

It should be noted that when the corresponding opening angles are not available in Table 2, an interpolation calculation may be performed to obtain a target opening angle that matches both the current vehicle-speed and the current heat-dissipation demand. For example, the longitudinal data in Table 2 may be interpolated and calculated for values of the heat-dissipation demand corresponding to different vehicle-speeds. The data in Table 2 can be interpolated horizontally to obtain the target opening angle when the opening angle of the active air-intake grille is not within the data shown in Table 2. In this case, the interpolation calculation can be performed by fitting an equation to do the interpolation.

It should be understood that in Table 2, the heat-dissipation demand is specified in a range from 0% to 200%, where 0% is the minimum value and 200% the maximum value, which is only intended to better illustrate the inventive concept of the present disclosure. In practical applications, the value range of the heat-dissipation demand may be determined according to the actual situation. Meanwhile, the data in Table 2 are formulated by simulation and experiment on the premise of calculating or testing the influence of active air-intake grille on the energy consumption of the vehicle at different opening angles, as well as calculating or testing the low-voltage energy consumption of the cooling fan at different rotation-speeds. Therefore, the data in Table 2 may be used as an optimal implementation, in practical application, the data in Table 2 may also be determined based on actual situations of the vehicle.

As a result, the opening angle table provided in the present disclosure enables the vehicle to determine whether to increase the opening angle of the active air-intake grille or to increase the rotation-speed of the cooling fan as the heat-dissipation demand gradually increases in the driving state, based on the opening angle table. This allows alternate control of the opening angle of the active air-intake grille and the rotation-speed of the cooling fan to minimize the energy consumption of the vehicle.

In an implementable embodiment, the step 140 of determining, according to the residual heat-dissipation demand, a target speed gear required for the cooling fan of the vehicle to provide the residual heat-dissipation demand, also includes a step of: calculating, based on the residual heat-dissipation demand, a target speed gear required for the cooling fan of the vehicle to provide the residual heat-dissipation demand using a predetermined calculation equation, and the predetermined calculation equation is expressed as:

$$S=(H-L)\times M+L$$

where S denotes a target speed gear of the cooling fan, H denotes a maximum speed gear of the cooling fan, L denotes a minimum speed gear of the cooling fan, and M denotes the residual heat-dissipation demand.

Here, the highest speed gear minus the lowest speed gear in the predetermined calculation equation is actually an effective speed gear of the cooling fan, and then the speed gear required for the cooling fan to provide that residual heat-dissipation demand is calculated.

For example, in a case that the current vehicle-speed is 40 km/h and the current heat-dissipation demand is 20%. As can be seen from Table 2, when the active air-intake grille is opened at 10°, the maximum heat-dissipation demand supported by this position is 29.7%, which meets the heat-dissipation demand of 20%. Meanwhile, As can be seen from Table 2, when the active air-intake grille is opened at 10°, the active air-intake grille is capable of providing the heat-dissipation demand of 11%, and thus the residual heat-dissipation demand is 20%−11%=9%. In a case that the cooling fan of the vehicle has the lowest speed gear of 10% and the highest speed gear of 90%, the target speed gear of the cooling fan is: (90%−10%)×9%+10%=17.2%. Therefore, the determined opening angle of the active air-intake grille is 10° and then determined speed gear of the cooling fan is 17.2%.

It should be understood that in a case where the vehicle needs to be forced to close the active air-intake grille, the cooling fan is required to provide the full heat-dissipation demand, in this case, the determined current heat-dissipation demand is directly used to calculate the speed gear of the cooling fan. For example, if the current heat-dissipation demand is 20%, then the target speed gear of the cooling fan is: (90%−10%)×20%+10%=26%. In addition, in a case that the current heat-dissipation demand of the vehicle can be met when the active air-intake grille of the vehicle in an opened condition, then the cooling fan is controlled to stop operation, to save energy.

In an implementable embodiment, the method also includes a step of: controlling the active air-intake grille to be fully opened in an event that the cooling fan needs to be operated and the cooling fan malfunctions.

Here, priority should be given to the heat-dissipation demand rather than the energy consumption in the event that the cooling fan needs to be operated and the cooling fan malfunctions. Therefore, the active air-intake grille is directly opened fully to meet the heat-dissipation demand of the vehicle.

In an implementable embodiment, the method also includes a step of: controlling the active air-intake grille to be fully closed, and controlling the cooling fan to stop operation, in case that the vehicle does not have a heat-dissipation demand while the vehicle is in the driving state.

Here, the vehicle is in the driving state and the vehicle does not have a heat-dissipation demand, which may mean that the crew compartment of the vehicle needs to be insulated. For example, the vehicle is driven in winter and the crew compartment of the vehicle needs to be provided with warm air, the heat generated by the vehicle is used to heat the crew compartment. Therefore, the active air-intake grille can be controlled to be fully closed, and the cooling fan can be controlled to stop operation.

Figure 2:
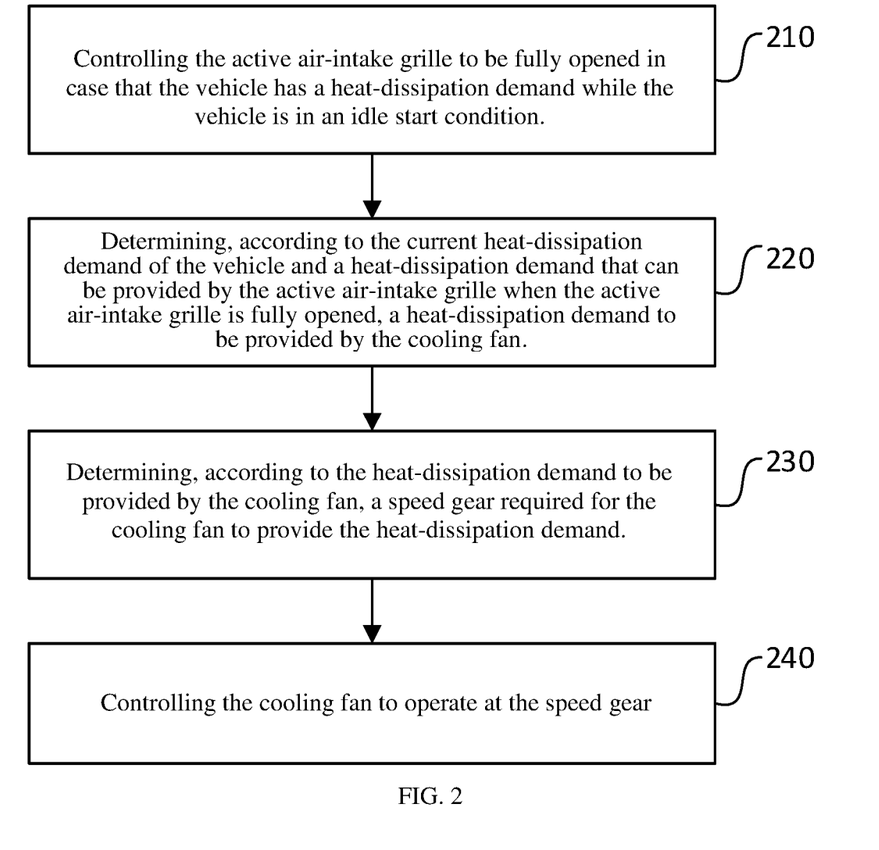
FIG. 2 is a flow diagram of a method for dissipating heat from a vehicle in an idle start condition, according to an exemplary embodiment.

FIG. 2 is a schematic flow diagram of a method for cooling a vehicle in an idle start condition according to an exemplary embodiment. As shown in FIG. 2, in an implementable embodiment, the method also includes steps 210 to 240.

In step 210, the active air-intake grille is controlled to be fully opened in case that the vehicle does not have a heat-dissipation demand while the vehicle is in the idle start condition.

In step 220, a heat-dissipation demand to be provided by the cooling fan is determined based on a current heat-dissipation demand of the vehicle and a heat-dissipation demand that can be provided by the active air-intake grille when the active air-intake grille is fully opened.

In step 230, a speed gear required for the cooling fan to provide the heat-dissipation demand is determined according to the heat-dissipation demand to be provided by the cooling fan.

In step 240, the cooling fan is controlled to operate at the speed gear.

Here, in the step 210, the idle start condition refers to a condition where the engine is started while the vehicle is in park and the engine is running in a neutral gear. The active air-intake grille is controlled to be fully opened in case that the vehicle has a heat-dissipation demand while the vehicle is in the idle start condition. At this time, the vehicle is in park and the active air-intake grille is fully opened without affecting the wind resistance coefficient of the vehicle. Therefore, the energy consumption of the vehicle can be saved by opening the active air-intake grille for heat dissipation.

In the step 220, the heat-dissipation demand to be provided by the cooling fan is calculated in case that the heat-dissipation demand of the vehicle is not meet even if the active air-intake grille is fully opened. The heat-dissipation demand to be provided by the cooling fan may be determined by a difference between the current heat-dissipation demand of the vehicle and the heat-dissipation demand that can be provided when the active air-intake grille is fully opened.

In the step 230, the speed gear required for the cooling fan to provide this heat-dissipation demand can be obtained by the same calculation method as in step 140, which will not be repeated herein.

In the step 240, the speed gear of the cooling fan is adjusted to the determined speed gear for operation after the speed gear of the cooling fan is determined.

As a result, the active air-intake grille is turned on as a priority to dissipate heat from the vehicle when the vehicle is in the idle start condition, and the cooling fan of the vehicle is controlled to be turned on only when the active air-intake grille cannot meet the heat-dissipation demand of the vehicle, thereby enabling the vehicle to maximize energy savings.

In an implementable embodiment, the method also includes a step of: controlling the active air-intake grille to be fully closed as well as controlling the cooling fan to stop operation in case that the vehicle does not have a heat-dissipation demand while the vehicle is in the idle start condition.

Here, the vehicle is in an idle start condition and the vehicle does not have a heat-dissipation demand, indicating that the vehicle may be in a warm-start running condition. At this time, heat loss of the vehicle should be reduced so that the engine, motor and other components can be warmed up rapidly in the shortest time. Thus, the vehicle is enabled to be warmed up rapidly by controlling the active air-intake grille of the vehicle to be fully closed, as well as controlling the cooling fan of the vehicle to stop operation.

In another exemplary embodiment, it is also provided a computer readable storage medium including program instructions that, when being executed by a processor, cause the steps of the method for dissipating heat from the vehicle as above-described to be implemented. For example, the computer-readable storage medium may be a memory including the program instructions as described above, and the above program instructions may be executed by a processor of an electronic device to implement the above-described method for dissipating heat from the vehicle.

Figure 3:
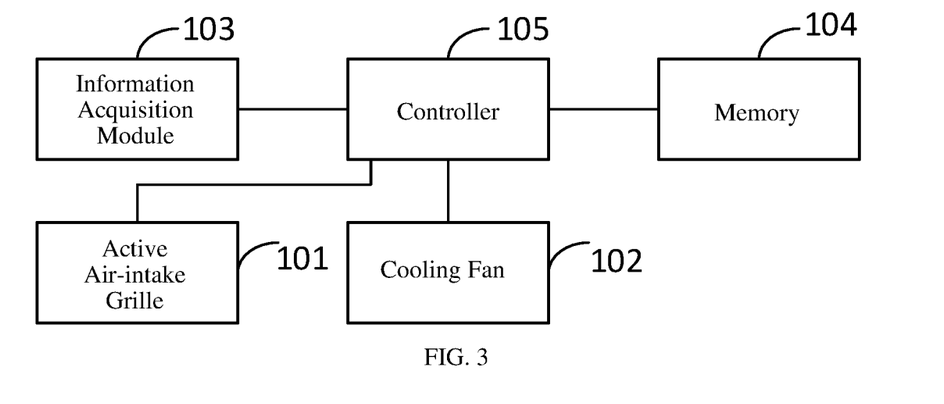
FIG. 3 is a schematic structural diagram of a vehicle according to an exemplary embodiment.

FIG. 3 is a schematic structural diagram of a vehicle according to an exemplary embodiment. As shown in FIG. 3, an exemplary embodiment of the present disclosure provides a vehicle, which includes an active air-intake grille 101, a cooling fan 102, an information acquisition module 103, a memory 104, and a controller 105.

The information acquisition module 103 is configured to obtain a current vehicle-speed and a current heat-dissipation demand of the vehicle.

The memory 104 is configured to store a program code for implementing the method for dissipating heat from the vehicle described in any of the above embodiments.

The controller 105 is configured to execute the program code stored in the memory to control the opening angle of the active air-intake grille 101 and a rotation-speed of the cooling fan 102, based on the current vehicle-speed and the current heat-dissipation demand.

In the vehicle, the information acquisition module 102 may be a speed sensor configured to collect speed information of the vehicle. The information acquisition module 102 may be a temperature sensor, or a sensor arranged on an air-conditioning system, or a cooling system, that is configured to collect information required for a calculation of the heat-dissipation demand.

Optionally, the cooling fan 102 is a multi-stage speed control fan.

To implement the foregoing embodiments, the present disclosure also provides a computing processing device, which includes a memory in which a computer readable code is stored; and one or more processors, and when the computer readable code is executed by the one or more processors, the aforementioned method for dissipating heat from the vehicle is implemented by the computing processing device.

To implement the foregoing embodiments, the present disclosure also provides a computer program including a computer readable code, and when the computer readable code is run on a computing processing device, the computing processing device is caused to perform the aforementioned method for dissipating heat from the vehicle.

To implement the foregoing embodiments, the present disclosure also provides a computer readable storage medium in which the aforementioned computer program is stored.

Figure 4:
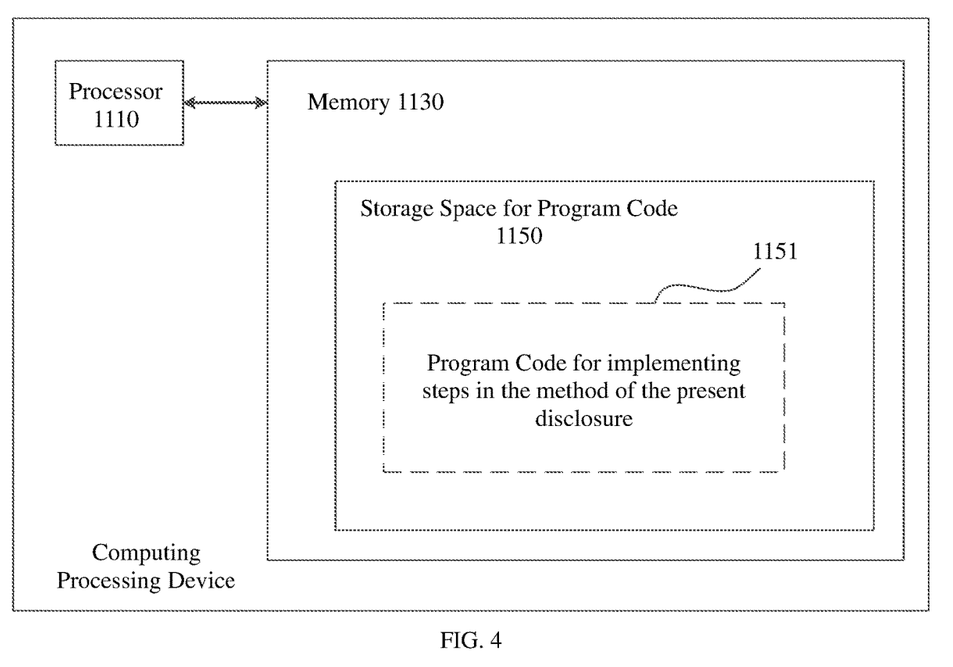
FIG. 4 is a schematic structural diagram of a computing processing device according to an exemplary embodiment of the present disclosure.
Figure 5:
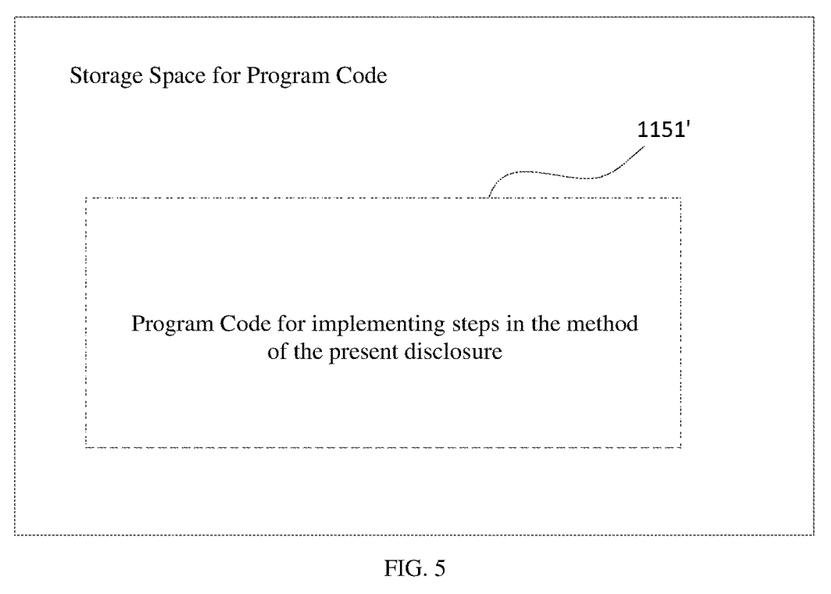
FIG. 5 provides a schematic diagram of a storage unit for a portable or fixed implementation of a program code of a method according to the present invention, according to an exemplary embodiment of the present disclosure.

FIG. 4 provides a schematic structural diagram of a computing processing device according to an embodiment of the present disclosure. The computing processing device typically includes a processor 1110 and a computer program product or computer readable medium in form of a memory 1130. The memory 1130 may be an electronic memory such as flash memory, EEPROM (electrically erasable programmable read-only memory), EPROM, hard disk, or ROM. The memory 1130 has a storage space 1150 for a program code 1151 to perform any of the steps in the above-described method. For example, the storage space 1150 for the program code may include individual program codes 1151 for implementing the various steps in the method as above-described, respectively. These program codes may be read from or written to one or more computer program products. These computer program products include program code carriers such as hard disks, compact disks (CDs), memory cards, or floppy disks. Such a computer program product is typically a portable or fixed storage unit as shown in FIG. 5. The storage unit may include a storage segment, a storage space, etc., having a similar arrangement to the memory 1130 in the computing processing device of FIG. 4. The program code may, for example, be compressed in an appropriate form. Typically, the memory unit includes a computer readable code 1151', i.e., a code that can be read by, for example, a processor such as 1110 which, when run on the computing processing device, causes the computing processing device to perform the various steps in the method described above.

Preferred embodiments of the present disclosure are described in detail above in conjunction with the drawings, however, the present disclosure is not limited to the specific details in the above embodiments, and a variety of simple variants of the schemes of the present disclosure may be made within the scope of technical contemplation of the present disclosure, these simple variants fall within the protection scope of the present disclosure.

It should also be noted that each specific feature described in the above specific embodiment may be combined in any suitable way without contradiction, and to avoid unnecessary repetition, the present disclosure does not explain the various possible combinations separately.

What is claimed is:

1. A method for dissipating heat from a vehicle, comprising:
    obtaining a current vehicle-speed and a current heat-dissipation demand of the vehicle while the vehicle is in a driving state;
    determining, according to the current vehicle-speed and the current heat-dissipation demand, a target opening angle of an active air-intake grille matching both the current vehicle-speed and the current heat-dissipation demand;
    determining a residual heat-dissipation demand of the vehicle based on the current heat-dissipation demand and a heat-dissipation demand that the target opening angle can provide;
    determining, according to the residual heat-dissipation demand, a target speed gear required for a cooling fan of the vehicle to provide the residual heat-dissipation demand;
    adjusting an opening angle of the active air-intake grille to the target opening angle and adjusting a speed gear of the cooling fan to the target speed gear, to perform a heat dissipation for the vehicle, and
    controlling the active air-intake grille to be fully opened in an event that the cooling fan needs to be operated and the cooling fan malfunctions.

2. The method for dissipating heat from the vehicle according to claim 1, wherein the determining, according to the current vehicle-speed and the current heat-dissipation demand, the target opening angle of the active air-intake grille matching both the current vehicle-speed and the current heat-dissipation demand, comprises:
    looking up, in a predetermined opening angle table, the target opening angle of the active air-intake grille matching both the current vehicle-speed and the current heat-dissipation demand, according to the current vehicle-speed and the current heat-dissipation demand;
    wherein one vehicle-speed and a value of one heat-dissipation demand at that vehicle-speed corresponds to one opening angle in the opening angle table; and
    wherein in the opening angle table, the value of the heat-dissipation demand at a same vehicle-speed increases as the opening angle of the active air-intake grille increases, and wherein the value of the heat-dissipation demand at a same opening angle increases as the vehicle-speed increases after the vehicle-speed of the vehicle reaches a predetermined speed threshold.

3. The method for dissipating heat from the vehicle according to claim 1, wherein the determining, according to the residual heat-dissipation demand, the target speed gear required for the cooling fan of the vehicle to provide the residual heat-dissipation demand, comprises:
    calculating, according to the residual heat-dissipation demand, the target speed gear required for the cooling fan of the vehicle to provide the residual heat-dissipation demand using a predetermined calculation equation, and the predetermined calculation equation is expressed as follows:

$$S=(H-L)\times M+L$$

wherein, S denotes the target speed gear of the cooling fan, H denotes a maximum speed gear of the cooling fan, L denotes a minimum speed gear of the cooling fan, and M denotes the residual heat-dissipation demand.

4. The method for dissipating heat from the vehicle according to claim 1, further comprising:
    controlling the active air-intake grille to be fully closed and controlling the cooling fan to stop operation in case that the vehicle does not have a heat-dissipation demand while the vehicle is in the driving state.

5. The method for dissipating heat from the vehicle according to claim 1, further comprising:
    controlling the active air-intake grille to be fully opened in case that the vehicle has a heat-dissipation demand while the vehicle is in an idle start condition; and
    determining, according to the current heat-dissipation demand of the vehicle and a heat-dissipation demand that can be provided by the active air-intake grille when the active air-intake grille is fully opened, a heat-dissipation demand to be provided by the cooling fan;
    determining, according to the heat-dissipation demand to be provided by the cooling fan, a speed gear required for the cooling fan to provide the to-be-provided heat-dissipation demand; and
    controlling the cooling fan to operate at the speed gear.

6. The method for dissipating heat from the vehicle according to claim 5, further comprising:
    controlling the active air-intake grille to be fully closed and controlling the cooling fan to stop operation in case that the vehicle does not have a heat-dissipation demand while the vehicle is in the idle start condition.

7. A vehicle, comprising:
    an active air-intake grille;
    a cooling fan;
    an information acquisition module, configured to obtain a current vehicle-speed and a current heat-dissipation demand of the vehicle;
    a memory, configured to store a program code for implementing operations that comprises:
        obtaining a current vehicle-speed and a current heat-dissipation demand of the vehicle while the vehicle is in a driving state;
        determining, according to the current vehicle-speed and the current heat-dissipation demand, a target opening angle of an active air-intake grille matching both the current vehicle-speed and the current heat-dissipation demand;
        determining a residual heat-dissipation demand for the vehicle based on the current heat-dissipation demand and a heat-dissipation demand that the target opening angle can provide;
        determining, according to the residual heat-dissipation demand, a target speed gear required for a cooling fan of the vehicle to provide the residual heat-dissipation demand;

adjusting an opening angle of the active air-intake grille to the target opening angle and adjusting a speed gear of the cooling fan to the target speed gear, to perform a heat dissipation for the vehicle; and controlling the active air-intake grille to be fully opened in an event that the cooling fan needs to be operated and the cooling fan malfunctions; and a controller, configured to execute the program code stored in the memory, to control the opening angle of the active air-intake grille and the speed gear of the cooling fan according to the current vehicle and the current heat-dissipation demand.

8. The vehicle according to claim 7, wherein the cooling fan is a multi-stage speed control fan.

9. The vehicle according to claim 7, wherein the operation of determining, according to the current vehicle-speed and the current heat-dissipation demand, the target opening angle of the active air-intake grille matching both the current vehicle-speed and the current heat-dissipation demand, comprises:

looking up, in a predetermined opening angle table, the target opening angle of the active air-intake grille matching both the current vehicle-speed and the current heat-dissipation demand, according to the current vehicle-speed and the current heat-dissipation demand;

wherein one vehicle-speed and a value of one heat-dissipation demand at that vehicle-speed corresponds to one opening angle in the opening angle table; and wherein, in the opening angle table, the value of the heat-dissipation demand at a same vehicle-speed increases as the opening angle of the active air-intake grille increases, and wherein the value of the heat-dissipation demand at a same opening angle increases as the vehicle-speed increases after the vehicle-speed of the vehicle reaches a predetermined speed threshold.

10. The vehicle according to claim 7, wherein the operation of determining, according to the residual heat-dissipation demand, the target speed gear required for the cooling fan of the vehicle to provide the residual heat-dissipation demand, comprises:

calculating, according to the residual heat-dissipation demand, the target speed gear required for the cooling fan of the vehicle to provide the residual heat-dissipation demand using a predetermined calculation equation, and the predetermined calculation equation is expressed as follows:

$$S=(H-L)\times M+L$$

wherein, S denotes the target speed gear of the cooling fan, H denotes a maximum speed gear of the cooling fan, L denotes a minimum speed gear of the cooling fan, and M denotes the residual heat-dissipation demand.

11. The vehicle according to claim 7, wherein the operations further comprise:

controlling the active air-intake grille to be fully closed and controlling the cooling fan to stop operation in case that the vehicle does not have a heat-dissipation demand while the vehicle is in the driving state.

12. The vehicle according to claim 7, wherein the operations further comprise:

controlling the active air-intake grille to be fully opened in case that the vehicle has a heat-dissipation demand while the vehicle is in an idle start condition; and determining, according to the current heat-dissipation demand of the vehicle and a heat-dissipation demand that can be provided by the active air-intake grille when the active air-intake grille is fully opened, a heat-dissipation demand to be provided by the cooling fan;

determining, according to the heat-dissipation demand to be provided by the cooling fan, a speed gear required for the cooling fan to provide the to-be-provided heat-dissipation demand; and controlling the cooling fan to operate at the speed gear.

13. The vehicle according to claim 12, wherein the operations further comprise:

controlling the active air-intake grille to be fully closed and controlling the cooling fan to stop operation in case that the vehicle does not have a heat-dissipation demand while the vehicle is in the idle start condition.

14. A computing processing device, comprising:

a memory, in which a computer readable code is stored; and at least one processor, when the computer readable code is executed by the at least one processor, the computing processing device is caused to perform operations that comprises:

obtaining a current vehicle-speed and a current heat-dissipation demand of the vehicle while the vehicle is in a driving state;

determining, according to the current vehicle-speed and the current heat-dissipation demand, a target opening angle of an active air-intake grille matching both the current vehicle-speed and the current heat-dissipation demand;

determining a residual heat-dissipation demand for the vehicle based on the current heat-dissipation demand and a heat-dissipation demand that the target opening angle can provide;

determining, according to the residual heat-dissipation demand, a target speed gear required for a cooling fan of the vehicle to provide the residual heat-dissipation demand;

adjusting an opening angle of the active air-intake grille to the target opening angle and adjusting a speed gear of the cooling fan to the target speed gear, to perform a heat dissipation for the vehicle; and controlling the active air-intake grille to be fully opened in an event that the cooling fan needs to be operated and the cooling fan malfunctions.

* * * * *